United States Patent
Komada et al.

(10) Patent No.: US 9,282,224 B2
(45) Date of Patent: Mar. 8, 2016

(54) IMAGING APPARATUS HAVING EFFICIENT DUST REMOVAL APPARATUS AND CAMERA INCLUDING THE SAME

(71) Applicant: SAMSUNG ELECTRONICS CO., LTD., Suwon-si, Gyeonggi-do (KR)

(72) Inventors: Jun Komada, Yokohama (JP); Masahiro Shirono, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 14/051,546

(22) Filed: Oct. 11, 2013

(65) Prior Publication Data

US 2014/0160346 A1    Jun. 12, 2014

(30) Foreign Application Priority Data

Dec. 7, 2012 (JP) ................................ 2012-268272
Jun. 10, 2013 (KR) ........................ 10-2013-0066059

(51) Int. Cl.
*H04N 5/217* (2011.01)
*H04N 5/349* (2011.01)
*H04N 5/225* (2006.01)

(52) U.S. Cl.
CPC ............. *H04N 5/2171* (2013.01); *H04N 5/349* (2013.01); *H04N 5/2253* (2013.01)

(58) Field of Classification Search
CPC ... H04N 5/2171; H04N 5/349; H04N 5/2251; G02B 7/102
See application file for complete search history.

(56) References Cited

U.S. PATENT DOCUMENTS

| | | | |
|---|---|---|---|
| 8,599,308 B2 * | 12/2013 | Ji et al. | 348/373 |
| 8,866,952 B2 * | 10/2014 | Shimizu et al. | 348/340 |
| 9,007,509 B2 * | 4/2015 | Shimada et al. | 348/340 |
| 2003/0067544 A1 * | 4/2003 | Wada | 348/208.7 |
| 2006/0152112 A1 * | 7/2006 | Sasaki | 310/331 |
| 2006/0279638 A1 * | 12/2006 | Matsuda et al. | 348/208.7 |
| 2007/0092235 A1 | 4/2007 | Misawa | |
| 2007/0103579 A1 | 5/2007 | Niwamae et al. | |

(Continued)

FOREIGN PATENT DOCUMENTS

| | | |
|---|---|---|
| JP | 2000-278614 A | 10/2000 |
| JP | 2003-098059 A | 4/2003 |

(Continued)

OTHER PUBLICATIONS

Oyoshi, Masahito; Imaging Apparatus and Program; Aug. 2007, JP Patent Application 2007193102, English Abstract.*

(Continued)

*Primary Examiner* — Roberto Velez
*Assistant Examiner* — Cynthia Segura
(74) *Attorney, Agent, or Firm* — Drinker Biddle & Reath LLP

(57) ABSTRACT

An imaging apparatus includes an imaging element unit having an imaging element and an optical element which is integrally formed with the imaging element and through which a luminous flux of light for imaging passes, a first piezoelectric element, and a displacement increment mechanism connected to the first piezoelectric element and the imaging element unit. The displacement increment mechanism displaces the imaging element unit by expanding or contracting the first piezoelectric element, where a portion of the first piezoelectric element in a lengthwise direction thereof is attached to the optical element.

12 Claims, 6 Drawing Sheets

(56) References Cited

U.S. PATENT DOCUMENTS

| | | | |
|---|---|---|---|
| 2008/0068488 A1* | 3/2008 | Kawai | 348/335 |
| 2008/0145042 A1* | 6/2008 | Kawai et al. | 396/55 |
| 2009/0002500 A1* | 1/2009 | Kawai et al. | 348/208.11 |
| 2009/0002541 A1* | 1/2009 | Niwamae | H04N 5/2171 348/335 |
| 2009/0002549 A1* | 1/2009 | Kobayashi | 348/374 |
| 2009/0003812 A1* | 1/2009 | Kawai | 396/53 |
| 2009/0153966 A1* | 6/2009 | Matsumoto | 359/508 |
| 2009/0206698 A1* | 8/2009 | Okazaki | 310/317 |
| 2009/0231537 A1* | 9/2009 | Yamamiya | 349/200 |
| 2010/0245966 A1* | 9/2010 | Yasuda | H01L 41/0953 359/224.1 |
| 2011/0096397 A1* | 4/2011 | Ohashi et al. | 359/507 |
| 2011/0304919 A1* | 12/2011 | Fujinaka et al. | 359/601 |
| 2012/0032557 A1* | 2/2012 | Furuta et al. | 310/317 |
| 2012/0120307 A1* | 5/2012 | Shimada et al. | 348/373 |
| 2012/0162500 A1 | 6/2012 | Yoshida | |
| 2012/0188639 A1* | 7/2012 | Urakami et al. | 359/508 |
| 2012/0268642 A1* | 10/2012 | Kawai | 348/335 |
| 2012/0287335 A1* | 11/2012 | Ji et al. | 348/373 |
| 2013/0094844 A1* | 4/2013 | Kang | G03B 3/10 396/125 |
| 2013/0100531 A1* | 4/2013 | Shimada et al. | 359/507 |
| 2014/0218588 A1* | 8/2014 | Ifuku et al. | 348/340 |

FOREIGN PATENT DOCUMENTS

| | | | |
|---|---|---|---|
| JP | 2006-047448 A | | 2/2006 |
| JP | 2007193102 A | * | 8/2007 ............ G02B 7/08 |
| JP | 2008-148178 A | | 6/2008 |
| JP | 2008-177844 A | | 7/2008 |
| JP | 4116185 B2 | | 7/2008 |
| JP | 2012-134818 A | | 7/2012 |

OTHER PUBLICATIONS

Extended European Search Report issued for related application EP 13190338.7, Jul. 27 2015, 7 pages.

* cited by examiner

IMAGING APPARATUS HAVING EFFICIENT DUST REMOVAL APPARATUS AND CAMERA INCLUDING THE SAME

CROSS-REFERENCE TO RELATED PATENT APPLICATIONS

This application claims the priority benefits of Japanese Patent Application No. 2012-268272, filed on Dec. 7, 2012, in the Japanese Patent Office, and Korean Patent Application No. 10-2013-0066059, filed on Jun. 10, 2013, in the Korean Intellectual Property Office, the disclosures of which are incorporated herein in their entirety by reference.

BACKGROUND

1. Field

Various embodiments of the invention relate to an imaging apparatus and a camera including the imaging apparatus.

2. Related Art

In an imaging apparatus, a luminous flux of light passing through a lens is received by an imaging element (e.g., a charge coupled device (CCD) image sensor), and image data is generated by processing a photoelectric conversion output of the imaging element. As a pixel pitch of an imaging element decreases, the quality of an image provided by the imaging apparatus is remarkably improved. Accordingly, when dust adheres to a surface of the imaging element or a surface of a transparent member disposed in front of the imaging element, shadows due to the dust are generated on a generated image, which becomes a problem.

Japanese Patent Publication No. 2012-134818 (Document 1) discloses a vibration apparatus including a bottom surface portion having a plate shape through which light incident on a CCD passes, an anti-vibration filter having a wall surface portion extending and protruding from one side of the bottom surface portion, where the anti-vibration filter is inclined at a predetermined angle and does not contact the bottom surface portion, and a piezoelectric device fixed on the wall surface portion of the anti-vibration filter.

Also, the imaging apparatus includes a technology to increase a resolution of an image or obtain a low pass filter effect by minutely displacing the imaging element parallel to a light receiving surface. To increase the resolution of an image, an image captured by displacing the position of the imaging element parallel to the light receiving surface to be smaller than a pitch of a pixel (e.g., about ½ of a pixel pitch), and an image captured at the original position prior to the displacement of the imaging element are synthetically processed. Also, to obtain a low pass filter effect, the imaging element is minutely displaced to be parallel to an imaging surface by using a predetermined frequency.

Japanese Patent Publication No. 2008-148178 (Document 2) discloses an imaging apparatus including an imaging element that receives a luminous flux of light from an object and performs photoelectric conversion, an actuator that minutely displaces the imaging element, and an expansion mechanism that expands a displacement of the actuator, transfers the expanded displacement to the imaging element, and minutely displaces the imaging element in a direction along the light receiving surface.

The technology of Document 1 is to vibrate an anti-vibration glass in the form of waves with respect to a surface of the anti-vibration glass. However, according to the technology of Document 1, a mechanism to displace the imaging element is provided separately because there is no means to displace the position of the imaging element.

In the technology of Document 2, the expansion mechanism minutely displaces the imaging element with respect to the light receiving surface. Also, dust adhering to a protection glass arranged in front of the imaging element is shaken off by repeating the minute displacement of the actuator. However, since the protection glass vibrates in a direction parallel to a surface of the protection glass in this technology, the vibration due to the expansion and contraction of the actuator has little effect in shaking the dust off.

SUMMARY

Various embodiments provide an imaging apparatus that may efficiently remove dust adhering to a surface of an optical element disposed in front of an imaging element and may change the position of the imaging element, and a camera including the imaging apparatus.

According to an embodiment, an imaging apparatus includes an imaging element unit including an imaging element, and an optical element which is integrally formed with the imaging element and through which a luminous flux of light for imaging passes, a first piezoelectric element, and a displacement increment mechanism connected to the first piezoelectric element and the imaging element unit, and displacing the imaging element unit by expanding or contracting the first piezoelectric element, where a portion of the first piezoelectric element in a lengthwise direction thereof is attached to the optical element.

The first piezoelectric element may displace the imaging element unit when being driven by DC power and vibrate the optical element when being driven by AC power.

The imaging apparatus may further include a first frame on which the displacement increment mechanism is supported, a second frame, and a second piezoelectric element that connects the first frame and the second frame, and expands or contracts in a substantially perpendicular direction with respect to a displacement direction of the displacement increment mechanism.

The displacement increment mechanism may include a first link and a second link provided parallel to each other with the imaging element interposed between the first link and the second link, a first connection link connecting the first link and the imaging element, and a second connection link connecting the second link and the imaging element unit, where the first piezoelectric element is connected to one of the first link and the second link.

The optical element may include a protection glass.
The optical element may include a low pass filter.
According to embodiment, a camera includes the above-described imaging apparatus.

BRIEF DESCRIPTION OF THE DRAWINGS

The above and other features and advantages will become more apparent by describing in detail exemplary embodiments thereof with reference to the attached drawings in which.

DETAILED DESCRIPTION

Figure 1:
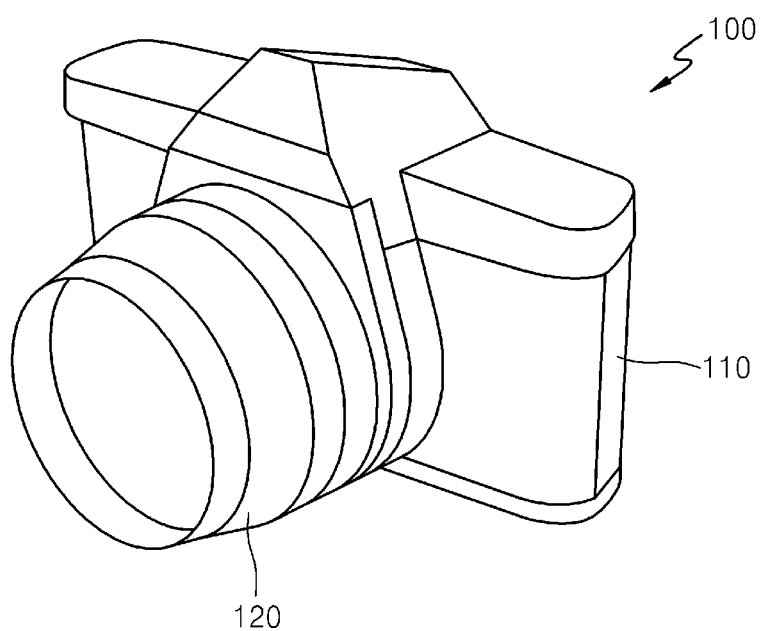
FIG. 1 is a perspective view illustrating the exterior of a camera, according to an embodiment.

The attached drawings for illustrating exemplary embodiments of the invention are referred to in order to gain a sufficient understanding of the invention, the merits thereof, and the objectives accomplished by the implementation of the various embodiments. Hereinafter, various embodiments will be described in detail with reference to the attached drawings. Like reference numerals in the drawings denote like elements.

FIG. 1 is a perspective view illustrating the exterior of a camera 100, according to an embodiment. Referring to FIG. 1, the camera 100 according to the present embodiment includes a case 110, a lens unit 120, and an imaging apparatus (not shown) arranged in the case 110. The imaging apparatus receives a luminous flux of light for imaging passing through the lens unit 120 by using an imaging element 11 (see FIG. 2), and generates image data by processing a photoelectric conversion signal output from the imaging element 11. The imaging apparatus included in the camera 100 of FIG. 1 according to an embodiment will be described below.

<1st Embodiment>

Figure 2:
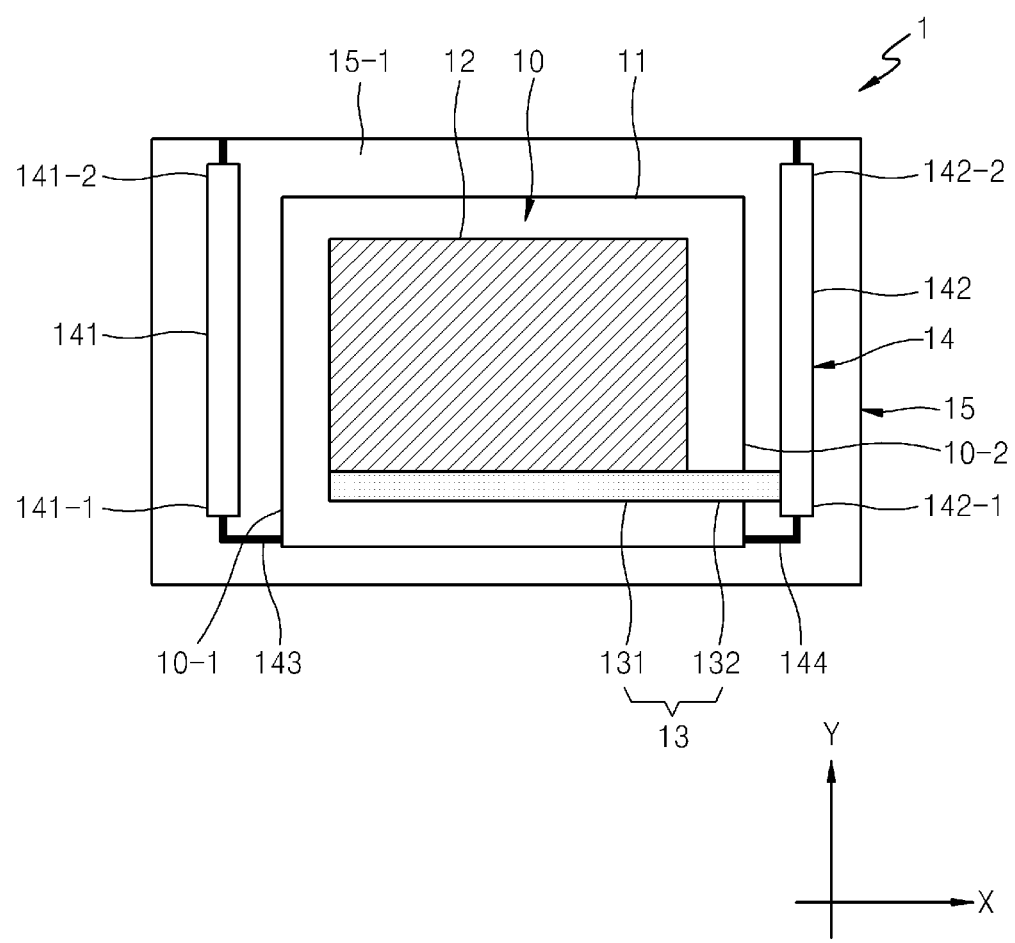
FIG. 2 is a diagram illustrating an imaging apparatus, according to an embodiment.
Figure 3:
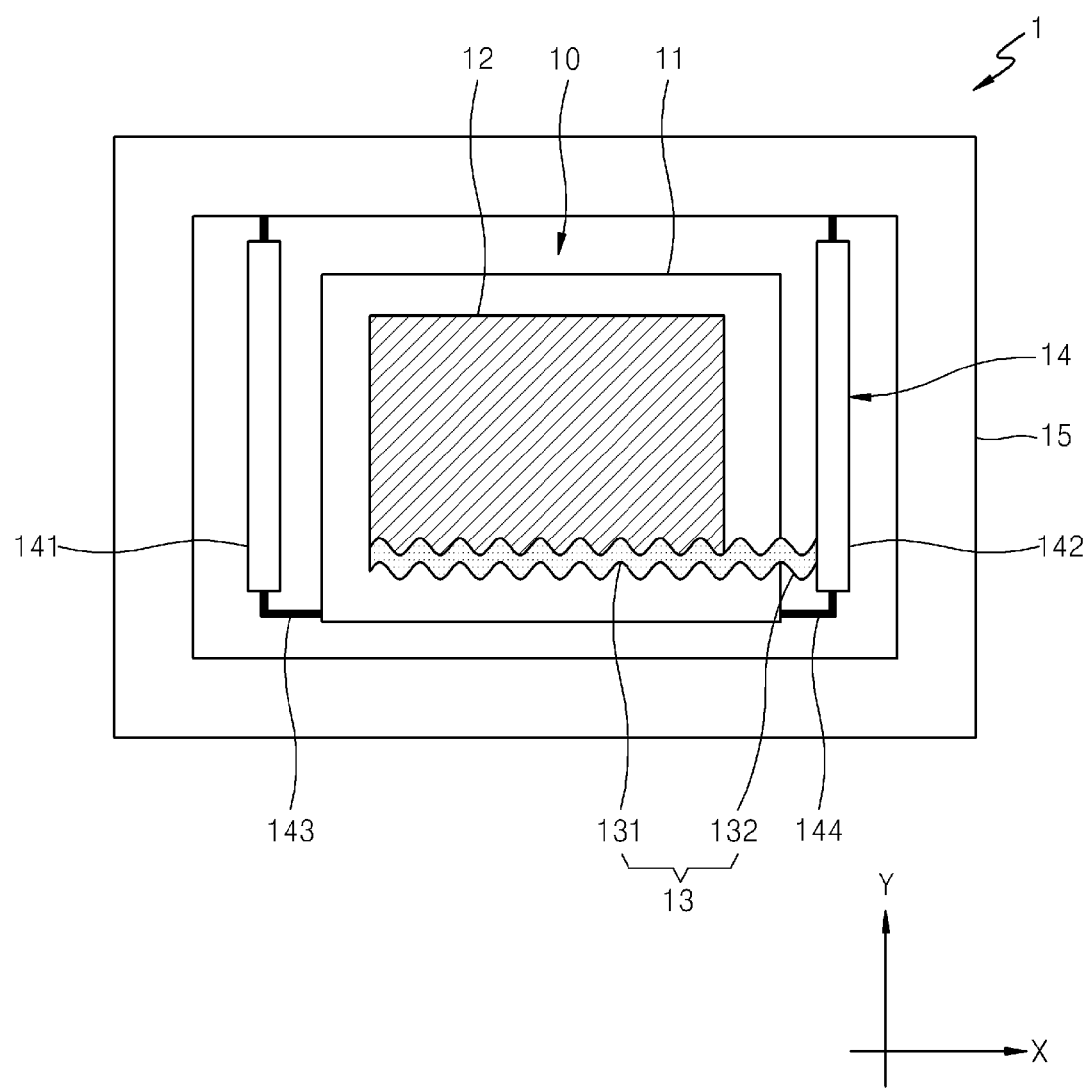
FIG. 3 is a diagram illustrating a state in which a piezoelectric element of the imaging apparatus of FIG. 2 is controlled and driven by AC power.
Figure 4:
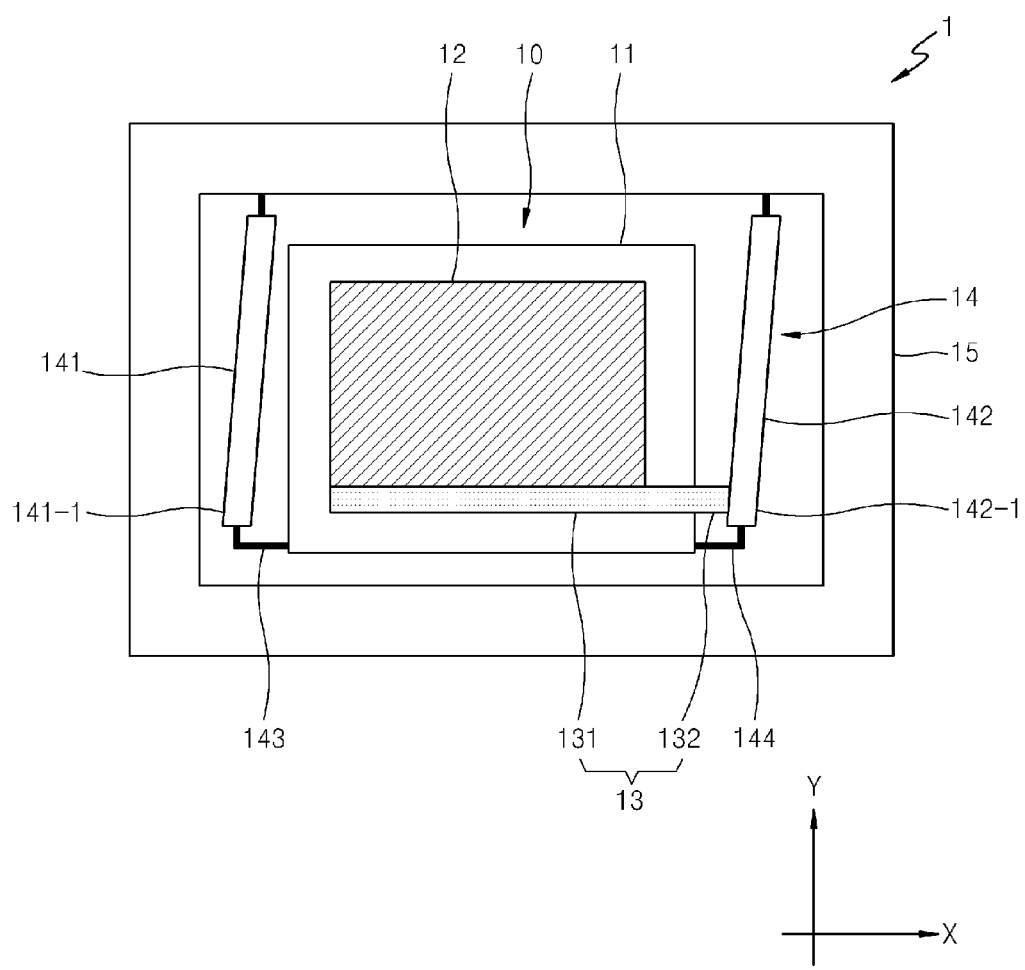
FIG. 4 is diagram illustrating a state in which an imaging element unit is displaced by a displacement increment mechanism of the imaging apparatus 1 of FIG. 2.

FIGS. 2 to 4 are diagrams illustrating an imaging apparatus 1, according to an embodiment. Referring to FIG. 2, the imaging apparatus 1 includes a first frame 15, an imaging element unit 10 supported by the first frame 15 to be displaceable or movable, a displacement increment mechanism 14 that connects the first frame 15 and the imaging element unit 10, and a piezoelectric element 13, as a first piezoelectric element, that connects the imaging element unit 10 and the displacement increment mechanism 14.

The first frame 15 may have, for example, a rectangular frame structure having a hollow portion therein. The imaging element unit 10 and the displacement increment mechanism 14 may be arranged inside the first frame 15.

The imaging element unit 10 includes an optical element 12 that is integrally formed with an imaging element 11. The imaging element 11 includes a plurality of photoelectric conversion elements arranged in a plate shape. For example, the imaging element 11 may be a two-dimensional charge coupled device (CCD) image sensor or a two-dimensional complementary metal oxide semiconductor (CMOS) image sensor.

The optical element 12 may include a low pass filter having a plate shape manufactured of, for example, crystal. Also, the optical element 12 may include a protection glass for protecting the imaging element 11. The optical element 12 is arranged roughly or substantially parallel to the imaging element 11 on a front surface of the imaging element 11 close to the lens unit 120. Light passing through the lens unit 120 passes through the optical element 12 and forms an image on the imaging element 11.

The piezoelectric element 13 is a piezoelectric element having a roughly or substantially rectangular shape and may be of a single layer structure or a multilayer structure and having. A portion of the piezoelectric element 13 in a lengthwise direction thereof, that is, one end portion thereof, is attached to the optical element 12. As illustrated in FIG. 2, an attachment portion 131 of the piezoelectric element 13 is attached to the optical element 12. In this embodiment, the attachment portion 131 of the piezoelectric element 13 is attached to a front surface of the optical element 12 close to the lens unit 120. The piezoelectric element 13 may be attached to a side surface, or front and side surfaces, of the optical element 12.

In the following description, the portion of the piezoelectric element 13 attached to the optical element 12 is the attachment portion 131 and a portion of the piezoelectric element 13 that is not attached to the optical element 12 is an expandable portion 132. In the embodiment illustrated in FIG. 2, about 9/10 of the length of the piezoelectric element 13 is the attachment portion 131 that is attached to the optical element 12, but the invention is not limited thereto. The length of the attachment portion 131 may be determined based on whether the length may be long enough to apply sufficient flexural vibration to the optical element 12 as described below. For example, the length of the attachment portion 131 may be about 2/3 or 1/2 of the length of the piezoelectric element 13. The major (longer) side of the piezoelectric element 13 is arranged roughly or substantially parallel to the X-axis, and thus the piezoelectric element 13 may be driven or controlled to be expandable/contractible in the X-axis direction. An end portion of the expandable portion 132 is connected to the displacement increment mechanism 14.

For convenience of explanation, in FIG. 2, the horizontal direction is set to be the X-axis and the vertical direction is set to be a Y-axis. Also, a positive direction of the Y-axis is referred to be up and a negative direction of the Y-axis is referred to be down. A positive direction of the X-axis is referred to be right and a negative direction of the X-axis is referred to be left.

The displacement increment mechanism 14 is connected to the end portion of the piezoelectric element 13 to increase the expansion/contraction of the piezoelectric element 13 and to displace or move the imaging element unit 10. The displacement increment mechanism 14 may be provided within a lengthwise range or a widthwise range of the first frame 15. For example, the displacement increment mechanism 14 may be provided in a hollow portion inside the first frame 15. The displacement increment mechanism 14 as illustrated in FIG. 2 includes a first link 141, a second link 142, and connection links 143 and 144.

The first link 141 and the second link 142 are disposed parallel to each other. One end of the connection link 143 is connected to one end 141-1 of the first link 141. One end of the connection link 144 is connected to one end 142-1 of the second link 142. The other end of the connection link 143 is connected to one side surface 10-1 of the imaging element unit 10. The other end of the connection link 144 is connected to the other side surface 10-2 of the imaging element unit 10. The other end 141-2 of the first link 141 is connected to an inner side of an upper frame 15-1 of the first frame 15. The other one 142-2 of the second link 142 is connected to the inner side of the upper frame 15-1 of the first frame 15.

The end portion of the expandable portion 132 of the piezoelectric element 13 is connected to the one end 142-1 of the second link 142.

FIG. 3 is a diagram illustrating a state in which the piezoelectric element 13 of the imaging apparatus 1 of FIG. 2 is driven or controlled by AC power. When a voltage of a predetermined frequency is applied to the piezoelectric element 13, the piezoelectric element 13 expands and contracts, that is, vibrates, at high speed according to a change in the voltage. Since a predetermined length of the piezoelectric element 13 (i.e., the attachment portion 131) is attached to the optical element 12, a high-speed flexure is generated on the surface of the optical element 12 by the expandable/contractible vibration of the piezoelectric element 13.

According to the present embodiment, a portion of the piezoelectric element 13 in the lengthwise direction thereof is attached to the optical element 12. When the piezoelectric element 13 is driven or controlled by AC power, vibration may be generated on the optical element 12 to displace or move the optical element 12 in a direction perpendicular to the light receiving surface thereof. Accordingly, dust adhering to the optical element 12 may be efficiently shaken off.

FIG. 4 is a diagram illustrating a state in which the imaging element unit 10 is displaced or moved by the displacement increment mechanism 14 of the imaging apparatus 1 of FIG. 2. In order to displace or move the imaging element unit 10, the piezoelectric element 13 is driven or controlled by DC power. When the piezoelectric element 13 is driven or controlled by DC power, the expandable portion 132 expands. When the expandable portion 132 expands, the distance between the optical element 12 and the portion of the second link 142 to which the piezoelectric element 13 is connected increases. Accordingly, the ends 141-1 and 142-1 are inclined to be moved in the negative direction of the X-axis with respect to respective support points of portions where the first link 141 and the second link 142 are connected to the first frame 15. Thus, the imaging element unit 10 connected to the piezoelectric element 13 may be displaced or moved in the negative direction of the X-axis.

The imaging apparatus 1 according to the present embodiment may displace or move the imaging element unit 10 in the X-axis direction by driving or controlling the piezoelectric element 13 with DC power. As described above, the imaging apparatus 1 according to the present embodiment may shake off dust on the optical element 12 and also move the imaging element 11 by using only the piezoelectric element 13.

<2nd Embodiment>

Figure 5:
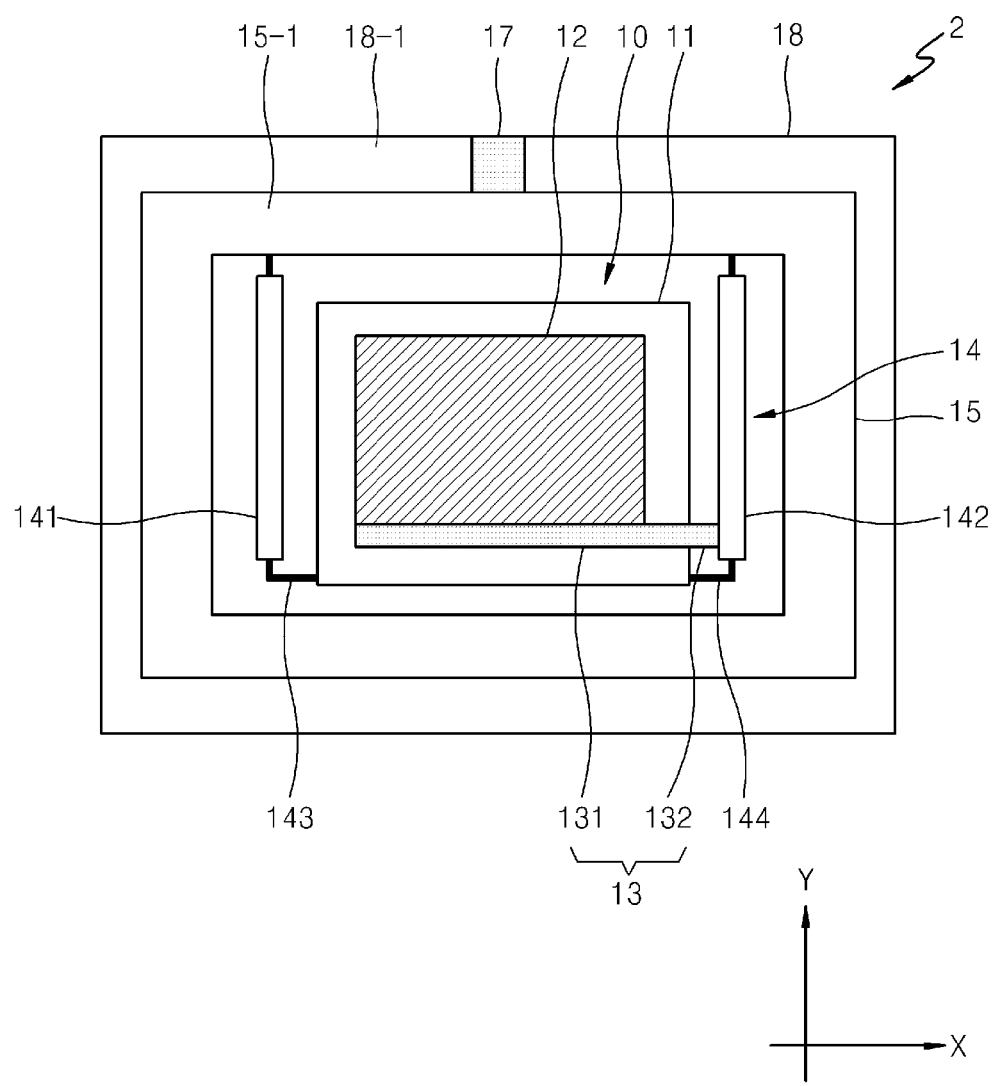
FIG. 5 is a diagram illustrating an imaging apparatus, according to another embodiment.

FIG. 5 is a diagram illustrating an imaging apparatus 2, according to another embodiment. Referring to FIG. 5, the imaging apparatus 2 according to the present embodiment further includes a piezoelectric element 17 as a second piezoelectric element and a second frame 18 as a support portion disposed outside the first frame 15. For example, the second frame 18 has a rectangular frame larger than the first frame 15. The first frame 15 may be arranged inside the second frame 18. One end of the piezoelectric element 17 is connected to the outside surface of the upper frame 15-1 of the first frame 15. The other end of the piezoelectric element 17 is connected to the inside surface of an upper frame 18-1 of the second frame 18. The piezoelectric element 17 is driven or controlled by DC power to expand/contract in the Y-axis direction.

According to the present embodiment, as the piezoelectric element 17 of the imaging apparatus 2 is driven or controlled by DC power, the piezoelectric element 17 expands/contracts and thus the imaging element unit 10 may be displaced or moved further in the Y-axis direction.

The displacement increment mechanism 14 is not limited to the parallel link mechanism illustrated in FIGS. 2 to 5. Any mechanism having a structure in which a portion of the piezoelectric element 13 in the lengthwise direction thereof is attached to the optical element 12 and that is displaceable or movable in the Y-axis direction or X-axis direction or in their respective opposite directions by the expansion/contraction of the piezoelectric element 13 may be employed therefor.

<3rd Embodiment>

Figure 6:
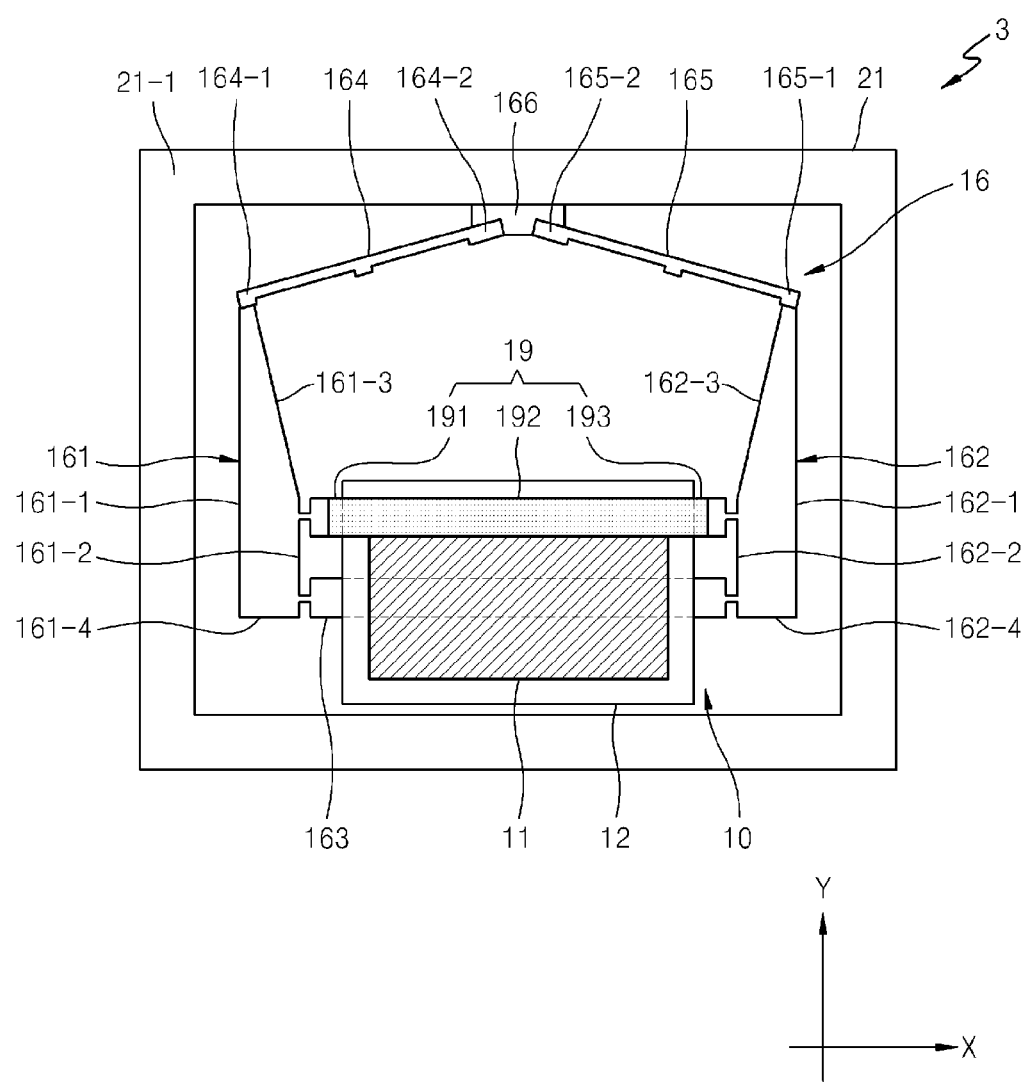
FIG. 6 is a diagram illustrating an imaging apparatus, according to another embodiment.

FIG. 6 is a diagram illustrating an imaging apparatus 3, according to another embodiment. Referring to FIG. 6, the imaging apparatus 3 includes a first frame 21, the imaging element unit 10 supported on the inside of the first frame 21 to be displaceable or movable, a displacement increment mechanism 16 is disposed inside the first frame 21 and connects the first frame 21 and the imaging element unit 10, and a piezoelectric element 19, as a first piezoelectric element, is connected between the imaging element unit 10 and the displacement increment mechanism 16.

The displacement increment mechanism 16 includes a first link 161, a second link 162, a support link 163, a first operation link 164, a second operation link 165, and an operation member 166. The displacement increment mechanism 16 has a roughly or substantially pentagonal shape with the support link 163 as a base.

The first and second links 161 and 162 each have a roughly or substantially trapezoidal shape. Two sides 161-1 and 161-2 of the first link 161 and two sides 162-1 and 162-2 of the second link 162, which are parallel to each other, are parallel to the Y-axis. Two sides 161-3 and 161-4 connect the two parallel sides 161-1 and 161-2 of the first link 161, and two sides 162-3 and 162-4 connect the two parallel sides 162-1 and 162-2 of the second link 162. The sides 161-4 and 162-4 are parallel to the X-axis. The first and second links 161 and 162 are arranged such that relatively short sides, or the minor (shorter) sides, of the two parallel sides 161-1 and 161-2 and the two parallel sides 162-1 and 162-2 can face each other. In the present embodiment, the minor (shorter) sides are the parallel side 161-2 of the first link 161 and the parallel side 162-2 of the second link 162.

The support link 163 connects the first and second links 161 and 162. The support link 163 has a roughly or substantially rectangular shape. The major (longer) side of the support link 163 is provided parallel to the X-axis so that the support link 163 connects a lower end of the minor (shorter) side 161-2 of the first link 161 and a lower end of the minor (shorter) side 162-2 of the second link 162.

The first operation link 164 has one end 164-1 connected to an upper end portion of the first link 161 and the other end 164-2 connected to a lower surface of the operation member 166. In the connection, the first operation link 164 is inclined such that the one end 164-1 is disposed to be lower than the other end 164-2. The second operation link 165 has one end 165-1 connected to an upper end portion of the second link 162 and the other end 165-2 connected to a lower surface of the operation member 166. In the connection, the second operation link 165 is inclined such that the one end 165-1 is disposed to be lower than the other end 165-2.

The operation member 166 has an upper surface connected to the inside of an upper frame 21-1 of the first frame 21 and a lower surface connected to the other end 164-2 of the first operation link 164 and the other end 165-2 of the second operation link 165.

The piezoelectric element 19 is connected between an upper portion of the minor (shorter) side 161-2 of the first link 161 and an upper portion of the minor (shorter) side 162-2 of the second link 162, to be roughly or substantially parallel to the support link 163. Also, the piezoelectric element 19 has a roughly or substantially rectangular shape and is driven or controlled by to be expandable/contractible in a direction parallel to the X-axis.

A portion of the piezoelectric element 19 in the lengthwise direction thereof, which is a middle portion in the present embodiment, is attached to the optical element 12. The portion of the piezoelectric element 19 attached to the optical element 12 is an attachment portion 192 and the portions that are not attached to the optical element 12 are expandable portions 191 and 193. As in the above-described embodiments, the length of the attachment portion 192 may be about 9/10, or 2/3 or 1/2, of the length of the piezoelectric element 19.

When the piezoelectric element 19 is driven or controlled by AC power, the piezoelectric element 19 expands and contracts at a frequency corresponding to a frequency of the AC power. Then, since the piezoelectric element 19 expands and contracts while the attachment portion 192 is attached to the optical element 12, vibration displacing or moving in a vertical direction with respect to the light receiving surface of the optical element 12, that is, flexure with respect to the light receiving surface of the optical element 12, is generated. Accordingly, dust adhering to the optical element 12 may be efficiently removed.

Also, when the piezoelectric element 19 is driven or controlled by DC power, the piezoelectric element 19 expands, and the expandable portions 191 and 193 that are not attached to the optical element 12 expand. Then, the first and second links 161 and 162 are horizontally spaced apart from each other with respect to the respective points where the first and second links 161 and 162 are connected to the support link 163. When the first and second links 161 and 162 are spaced apart from each other, an interval in an upper end portion between the first and second links 161 and 162 increases. Accordingly, inclination of each of the first and second operation links 164 and 165 with respect to the X-axis decreases and thus the piezoelectric element 19 and the support link 163 move upward. In other words, when the piezoelectric element 19 is driving-controlled by DC power, the pentagonal shape formed by the displacement increment mechanism 16 is slightly pressed in the vertical direction so that the imaging element unit 10 may be displaced or moved in the positive direction of the Y-axis.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An imaging apparatus comprising:
   an imaging element unit including an imaging element, and an optical element which is integrally formed with the imaging element and through which a luminous flux of light for imaging passes;
   a first piezoelectric element; and
   a displacement increment mechanism connected to the first piezoelectric element and the imaging element unit, and displacing the imaging element unit by expanding or contracting the first piezoelectric element,
   wherein a first portion of the first piezoelectric element in a lengthwise direction thereof is an attachment portion and is attached to the optical element and a second portion of the first piezoelectric element in a lengthwise direction thereof is an expandable portion and is not attached to the optical element.

2. The imaging apparatus of claim 1, wherein the first piezoelectric element displaces the imaging element unit when being driven by DC power and vibrates the optical element when being driven by AC power.

3. The imaging apparatus of claim 1, further comprising:
   a first frame on which the displacement increment mechanism is supported;
   a second frame; and
   a second piezoelectric element that connects the first frame and the second frame, and expands or contracts in a substantially perpendicular direction with respect to a displacement direction of the displacement increment mechanism.

4. The imaging apparatus of claim 1, wherein the displacement increment mechanism comprises:
   a first link and a second link provided parallel to each other with the imaging element unit interposed between the first link and the second link;
   a first connection link connecting the first link and the imaging element unit; and
   a second connection link connecting the second link and the imaging element unit,
   wherein the first piezoelectric element is connected to one of the first link and the second link.

5. The imaging apparatus of claim 1, wherein the optical element comprises a protection glass.

6. The imaging apparatus of claim 1, wherein the optical element comprises a low pass filter.

7. A camera comprising the imaging apparatus of claim 1.

8. The camera of claim 7, wherein the first piezoelectric element displaces the imaging element unit when being driven by DC power and vibrates the optical element when being driven by AC power.

9. The camera of claim 7, further comprising:
a first frame on which the displacement increment mechanism is supported;
a second frame; and
a second piezoelectric element that connects the first frame and the second frame, and expands or contracts in a substantially perpendicular direction with respect to a displacement direction of the displacement increment mechanism.

10. The camera of claim 7, wherein the displacement increment mechanism comprises:
a first link and a second link provided parallel to each other with the imaging element unit interposed between the first link and the second link;
a first connection link connecting the first link and the imaging element unit; and
a second connection link connecting the second link and the imaging element unit,
wherein the first piezoelectric element is connected to one of the first link and the second link.

11. The camera of claim 7, wherein the optical element comprises a protection glass.

12. The camera of claim 7, wherein the optical element comprises a low pass filter.

* * * * *